(12) United States Patent
Yajima et al.

(10) Patent No.: US 6,240,264 B1
(45) Date of Patent: May 29, 2001

(54) IMAGE OUTPUT PROCESSING APPARATUS

(75) Inventors: Shunsuke Yajima, Yamatokoriyama; Syoichiro Yoshiura, Tenri, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/439,785

(22) Filed: Nov. 12, 1999

(30) Foreign Application Priority Data

Nov. 25, 1998 (JP) .................................................. 10-334526

(51) Int. Cl.⁷ .................................................. G03G 15/00
(52) U.S. Cl. .............................................. 399/82; 399/299
(58) Field of Search ................................. 399/82, 83, 85, 399/87, 70, 75, 76, 54, 184, 223, 228, 299, 67, 69; 358/401, 468

(56) References Cited

U.S. PATENT DOCUMENTS 5,245,368 * 9/1993 Farrell et al. ....................... 399/87 X
5,930,551 * 7/1999 Nakazato et al. .................. 399/82 X

FOREIGN PATENT DOCUMENTS 6-4241    1/1994 (JP) .
8-258365  10/1996 (JP) .

* cited by examiner

Primary Examiner—Arthur T. Grimley
Assistant Examiner—Hoan Tran
(74) Attorney, Agent, or Firm—David G. Conlin; Dike, Bronstein, Roberts & Cushman, LLP

(57) ABSTRACT

During warming up such as carried out upon power application, a first or second condition managing section monitors the status of an always changing device such as an image station and a fixing device, and based upon the current status of the device and the features of data for print jobs that have been received, a control section determines the order of the jobs to be printed out and carries out the corresponding output. Therefore, it is possible to efficiently output images without delay in handling image data even during warming up upon power application.

10 Claims, 10 Drawing Sheets

FIG.6

| JOB | PAPER | NUMBER | COLOR/MONOCHROME |
|---|---|---|---|
| 1 | A4 | 1 | COLOR |
| 2 | A4 | 3 | MIXED |
| 3 | A4 | 6 | MONOCHROME |

IMAGE OUTPUT PROCESSING APPARATUS

FIELD OF THE INVENTION

The present invention relates to an image output processing apparatus, such as a printer and a digital composite machine, for recording and reproducing image data sent from an external apparatus, and more particularly concerns such a device for carrying out recording and reproducing processes based upon a plurality of pieces of image data.

BACKGROUND OF THE INVENTION

Under environments in which a plurality of data processing apparatuses are connected so as to form a network, in the case when data, processed in the respective processing apparatuses, are to be printed out, in order to carry out an efficient output process, the printing apparatus carries out a job management by adding management information to the image data and temporarily storing it in a storing device such as a hard disk, and determines an order of output processes for the printed information stored in a storage device based upon a predetermined order of preference.

With respect to the method for determining the order of preference, for example, Japanese Laid-Open Patent Application No. 4241/1994 (Tokukaihei 6-4241, published on Jan. 14, 1994) discloses a method in which the order of jobs to be printed out is determined based upon the amount of image data, and Japanese Laid-Open Patent Application No. 258365/1996 (Tokukaihei 8-258365, published on Oct. 8, 1996) discloses a method for estimating time required for outputting image data based upon the amount and the kinds of image data.

Moreover, color printers, which print out color images, have been put into market as apparatuses for recording and reproducing images, and have made remarkable progresses in the printer market as well.

In such circumstances, in the case of color printers and color composite machines provided with, for example, an electrophotographing process, the characteristics of toner to be transferred on the transferring member or the quantities of toner to be transferred are respectively different between the case in which monochrome images are recorded and reproduced and the case in which color images are recorded and reproduced. For this reason, upon recording and reproducing monochrome images or color images, it is necessary to manage various statuses inside the apparatus, such as process conditions for recording and reproducing images and fixing conditions at the time of fixing on a copying material, in order to bring the apparatus to a recordable and reproducible state for each of the cases.

Normally, in color printers and color composite machines, the fixing temperature is set higher than the normal fixing temperature for monochrome images in order to ensure fixing of color images and to improve the fixing property and the color developing property. However, in conventional apparatuses, the apparatus is in a stand-by state without processing any image data sent from an external apparatus until, after application of power, the warming up has been complete to bring the apparatus to a recordable and reproducible state for all images. The resulting problem is that no print output is available until all the statuses inside the apparatus have brought into recordable states in such a case as immediately after power application in the morning.

Moreover, recently, in printers and digital composite machines, a recording device of a type for recording and reproducing images by scanning with a laser modulated based on data has been mainly used. In the case of the recording device of this type, by switching the number of revolutions of a polygon mirror for deflecting the laser beam, the resolution of an image to be reproduced can be altered and the reproducibility of an image and the recording process performance can be altered by switching the recording speed.

However, it cannot be said that those apparatuses that simply make a switchover on the recording device side in accordance with the features of an image (resolution, whether it is a color image or a monochrome image, whether or not it is a high picture-quality mode) have advanced greatly, and have the same problems as the above-mentioned apparatus that switches the temperature of the fixing device in accordance with the features of an image prior to the output process.

SUMMARY OF THE INVENTION

The objective of the present invention is to provide an image output processing apparatus which can monitor the always changing status of the apparatus during warming up such as carried out upon power application, and determine the order of jobs to be outputted based upon the current status of the apparatus and the features of data for print jobs that have been received so that it can output images efficiently without delay in handling image data.

In order to achieve the above-mentioned objective, the image output processing apparatus of the present invention is provided with an image input section for inputting image data, an image storing section for storing the image data inputted by the image input section on a job basis, an image forming section for forming an image of the image data stored in the image storing section on recording paper, and for outputting this, a condition managing section for managing the status of the image forming section during warming up of the image output processing apparatus, and a process order decision section for determining the order of output processes of the image data based upon the status of the image forming section managed by the condition managing section and the contents of the image data stored in the image storing section.

In the above-mentioned image output processing apparatus, during warming up of the image output processing apparatus, the status of the image forming section is managed by the condition managing section. For this reason, in the case when the image forming section is capable of operating under a plurality of different operational environments, the condition managing section makes a judgment as to the environment under which the image forming section first becomes operative, and output processes are successively carried out preferentially from a job that can be output-processed for images under this environment; thus, it is possible to carry out output processes efficiently without delay in handling jobs.

Moreover, in order to achieve the above-mentioned objective, the image output processing apparatus of the present invention, the image output processing apparatus of the present invention is provided with an image input section for inputting image data, an image storing section for storing the image data inputted by the image input section on a job basis, an image forming section which is capable of forming images in a first image forming mode and a second image forming mode different from the first image forming mode, and which forms an image of the image data stored in the image storing section on recording paper and outputs this, and a control section which controls the image forming section so that, during warming up of the image output processing apparatus, the mode of the image forming section is shifted to the first mode or the second mode in accordance with the conditions of the image data stored in the storing section so as to carry out an output process for the image data.

In the above-mentioned image output processing apparatus, during warming up of the image output processing apparatus, the control section shifts the mode of the image forming section to the first or the second image forming mode in accordance with the contents of jobs that have been stored in the image storing section in a stand-by state. Therefore, at the time when the image output processing apparatus has reached a level of the image forming mode suitable for a job to be first output-processed, an output process is carried out on the corresponding job. Thus, it becomes possible to solve the problem that no output process is available until the final level has been achieved, and consequently to carry out output processes efficiently without delay in handling jobs.

For a fuller understanding of the nature and advantages of the invention, reference should be made to the ensuing detailed description taken in conjunction with the accompanying drawings.

BRIEF DESCRIPTION OF THE DRAWINGS

FIG. 6 is an explanatory drawing that shows one example of a job list indicating jobs that have been accepted during warming up of the color digital copying machine.

FIG. 7(a) shows a case in which a printing job for monochrome images is first carried out, and FIG. 7(b) shows a case in which a printing job for color images is first carried out.

FIG. 9(a) shows a case in which a printing job for monochrome images is first carried out, and FIG. 9(b) shows a case in which a printing job for color images is first carried out.

DESCRIPTION OF THE EMBODIMENTS

The following description will discuss one embodiment of the present invention.

Figure 2:
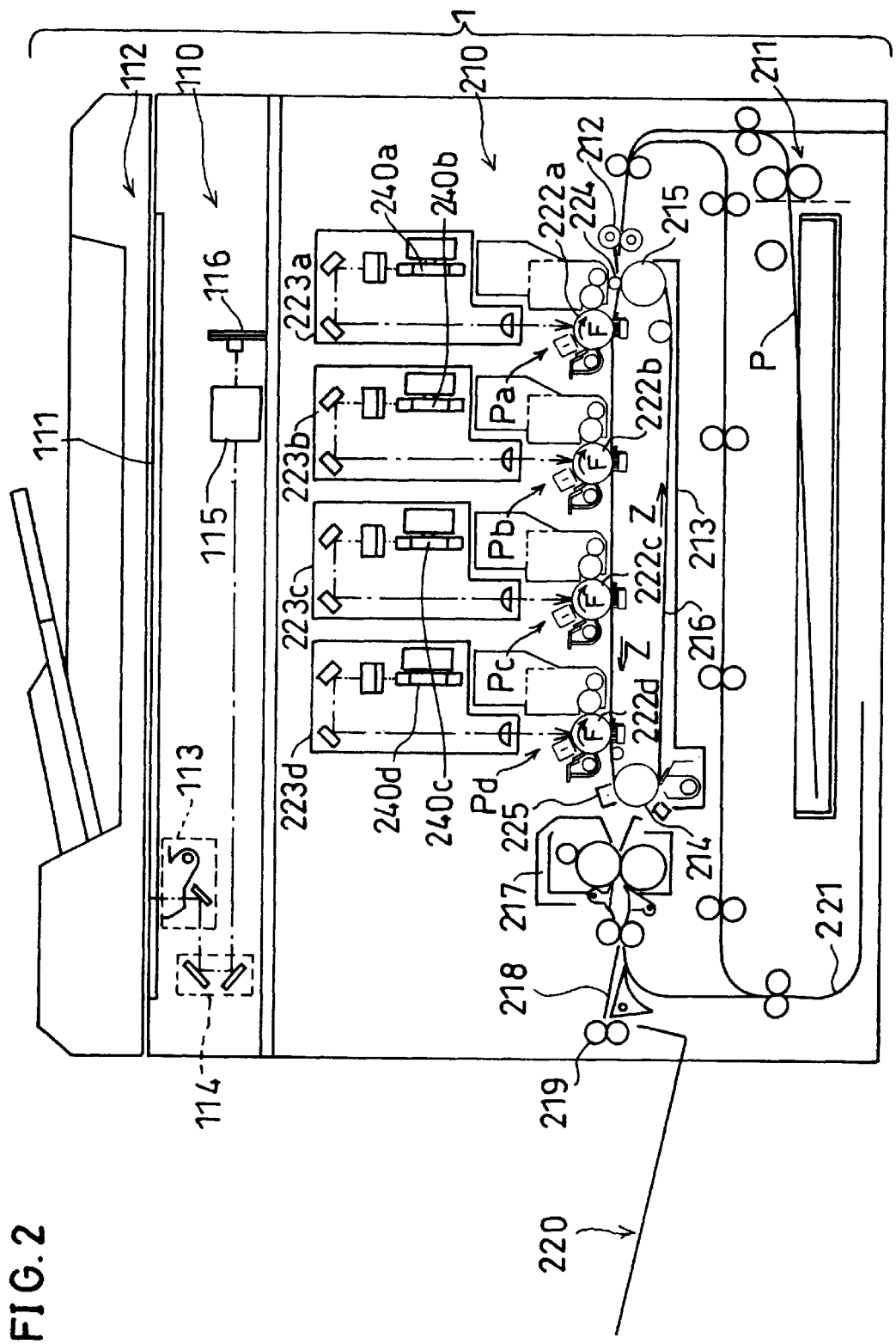
FIG. 2 is a cross-sectional view of the color digital copying machine that serves an image output processing apparatus.

As illustrated in FIG. 2, a digital color copying machine, which is an image output processing apparatus of the present embodiment, has an arrangement in which a document platen 111 and an operation panel (not shown) are placed on the top surface of a copying machine main body 1, and an image reading section 110 and an image forming section 210 (image forming means) are installed inside the copying machine main body 1.

On the top surface of the document platen 111, an automatic document feeder 112, which is supported on the document platen 111 in a manner so as to be freely opened and shut, and has a fixed position on the top surface of the document platen 111, is installed.

The above-mentioned automatic document feeder 112, which is a double sided automatic document feeder (RADF Recirculating Automatic Document Feeder) for dealing with double sided original documents, has an arrangement in which: a document is transported so that one side thereof is allowed to face an image read section 110 at the fixed position of the document platen 111, and upon completion of the image reading process on this side, the document is reversed and transported to the document platen 111 so that the other side is allowed to face the image read section 110 at the fixed position. Then, upon completion of the double sided image reading processes on one original document, this original document is discharged, and the double sided transporting operation is carried out on the next document. The above-mentioned document transportation and the side reversing operation are controlled in association with the whole operations of the digital color copying machine.

The image read section 110 is placed below the document platen 111 so as to read an image of the original document that has been transported on the document platen 111 by the automatic document feeder 112. The image read section 110 is provided with a first scanning unit 113 and a second scanning unit 114 serving as document scanning members, which are allowed to move reciprocally in parallel with the under surface of the document platen 111, optical lens 115 and a CCD line sensor 116 serving as a photoelectric transducer.

The first scanning unit 114 is provided with an exposure lamp for exposing the surface of an original document and a first mirror for deflecting a reflected light image from the original document in a predetermined direction, and allowed to move reciprocally at a fixed scanning rate with a predetermined gap being maintained from the under surface of the document platen 111. The second scanning unit 114 is provided with second and third mirrors that further deflect in a predetermined direction the reflected light image from the original document that has been deflected by the first mirror of the first scanning unit 113, and allowed to move reciprocally in a fixed speed relationship with the first scanning unit 113 in parallel therewith.

The optical lens 115 reduces the reflected light image from the original document that has been deflected by the third mirror of the second scanning unit, and converges the reduced light image on a predetermined position on the CCD line sensor 116.

The CCD line sensor 116, which successively subjects the converged light image to a photoelectrical conversion and outputs it as an electric signal, is a color CCD of three lines which can read a monochrome image or a color image, and output line data obtained by decomposing the color into the respective color components of R(red), G(green) and R(red). The document image information, converted into an electric signal by the CCD line sensor 116, is further transferred to an image processing section, not shown, in which it is subjected to predetermined image data processing.

Next, explanations will be given of the construction of the image forming section 210 and constructions of various parts related to the image forming section 210.

Below the image forming section 210, a paper feed mechanism 211, which separates sheets of paper (recording medium) P housed and stacked in a paper tray sheet by sheet, and supplies them to the image forming section 210, is installed. The sheet of paper, thus separated and supplied, is transported to the image forming section 210 with its timing being controlled by a pair of resist rollers 212 that are placed on the preceding side of the image forming section 210.

Below the image forming section 210 is installed a transfer conveyor belt mechanism 213. The transfer conveyor belt mechanism 213 is arranged so that paper P is electrostatically attracted to a transfer conveyor belt 216 that passes over a driving roller 214 and a driven roller 215 so as to extend virtually in parallel with each other, and thus transported.

Moreover, on the downstream side of the transfer conveyor belt mechanism 213 in a paper transport pass, a fixing device (fixing section) 217 for fixing a toner image transferred and formed on the paper P onto the paper P is installed. The paper P that has passed through the nip between a pair of fixing rollers in the fixing device 217 is allowed to pass through a transport direction switching gate 218, and ejected by a discharge roller 219 onto a paper discharge tray 220 that is attached to an external wall of the copying machine main body 1.

The switching gate 218 selectively switches the paper transport path so as to discharge the paper P after the fixing process onto the paper discharge tray 220 outside the copying machine main body 1, or so as to resupply it toward the image forming section 210. The paper P, the transport direction of which has been switched by the switching gate 218 again to the image forming section 210, is reversed in its sides while passing through a switching back transport path 221, and again supplied to the image forming section 210.

Moreover, above the transfer conveyor belt 216 in the image forming section 210, a first image forming station Pa, a second image forming station Pb, a third image forming station Pc and a fourth image forming station Pd are arranged in succession from the upstream side of the paper transport path, in the proximity of the transfer conveyor belt 216.

The transfer conveyor belt 216 is frictionally driven in the direction of arrow Z of FIG. 2 by the driving roller 214, allowed to hold the paper P that has been transported through the paper feed mechanism 211 as described above, and successively transports the paper P to the image forming stations Pa through Pd.

The respective image forming stations Pa, Pb, Pc and Pd, which have virtually the same construction, are respectively provided with photosensitive drums 222a, 222b, 222c and 222d that are rotatively driven in the direction of arrow F of FIG. 2. On the periphery of each of the photosensitive drums 222a through 222d, a charging device for uniformly charging each of the photosensitive drums 222a through 222d, a developing device for developing an electrostatic latent image formed on each of the photosensitive drums 222a through 222d, a transferring discharge device for transferring the developed toner image on each of the photosensitive drums 222a through 222d onto a sheet of paper P, and a cleaning device for removing residual toner from each of the photosensitive drums 222a through 222d, are successively installed along the rotation direction of each of the photosensitive drums 222a through 222d.

Moreover, above the photosensitive drums 222a through 222d, laser beam scanner units (hereinafter, referred to as LSU) 223a, 223b, 223c and 223d are respectively installed. Each of the LSUs 223a through 223d is provided with a semiconductor laser element (not shown) that emits dot light that is modulated in accordance with image data, a polygon mirror (deflection device) 240a, 240b, 240c or 240d for deflecting a laser beam from the semiconductor laser element in the main scanning direction, a f-θ lens and mirror for imaging the laser beam that has been deflected by the polygon mirror 240a, 240b, 240c or 240d on the surface of each of the photosensitive drums 222a through 222d, etc.

An image signal representative of a black component image of a color original document image is inputted to the LSU 223a, an image signal representative of a cyan component image of the color original document image is inputted to the LSU223b, an image signal representative of a magenta component image of the color original document image is inputted to the LSU 223c, and an image signal representative of a yellow component image of the color original document is inputted to the LSU223d, respectively.

Thus, an electrostatic latent image corresponding to document image information that has been subjected to a color conversion is formed on each of the photosensitive drums 222a to 222d. Here, black toner is stored in the developing device of the image station Pa, cyan color toner is stored in the developing device of the image station Pb, magenta color toner is stored in the developing device of the image station Pc, and yellow toner is stored in the developing device of the image station Pd, respectively, and the electrostatic latent images on the photosensitive drums 222a to 222d are developed by the toners of the respective colors. Thus, the document image information that has been subjected to a color conversion is reproduced as a toner image having each of the colors by the image forming section 210.

Moreover, a paper attracting charger 224 provided as a brush is installed between the first image formation station Pa and the paper feed mechanism 211, and the paper attracting charger 224 electrostatically charges the surface of the transfer conveyor belt 216. Thus, the paper P, supplied from the paper feed mechanism 211, is transported from the first image formation station Pa to the fourth image formation station Pd without being offset, while being positively attracted onto the transfer conveyor belt 216.

A static-eliminating discharger 225 is placed virtually right above the driving roller 214, between the fourth image formation station Pd and the fixing device 217. An ac current is applied to the static-eliminating discharger 225 so as to separate the paper P electrostatically attracted to the conveyor belt 216 from the transfer conveyor belt 216.

In the digital color copying machine having the above-mentioned arrangement, paper in the form of cut sheets is used as the paper P. When a sheet of paper is sent from the paper feed cassette, and supplied to the guide in the paper transport path in the paper feed mechanism 211, the leading portion of the sheet of paper P is detected by a sensor (not shown), and the sheet of paper is temporarily stopped by the pair of the resist roller 212 in accordance with a detection signal outputted from the sensor.

Then, the sheet of paper P is sent onto the transfer conveyor belt 216 that is allowed to rotate in the direction of arrow Z of FIG. 2 in synchronism with the respective image formation station Pa through Pd. At this time, since a predetermined static charge is applied to the transfer conveyor belt 216 by the attracting charger 224 as described above, the sheet of paper P is stably transported and supplied while being sent through the respective image formation station Pa through Pd.

In the respective image formation stations Pa through Pd, toner images having the respective colors are formed, and superposed on the supporting surface of the paper P that is being transported by the transfer conveyor belt 216 while being electrostatically attracted thereon. Upon completion of the transferring process of the image in the fourth image formation station Pd, the sheet of paper P is separated from the transfer conveyor belt 216 successively from its leading portion by the static-eliminating discharger 225, and directed to the fixing device 217. Finally, the sheet of paper P on which the toner image has been fixed is discharged onto the paper discharge tray 220 from a paper outlet (not shown).

Here, in the above explanation, LSUs 223a through 223d are used as optical writing units so as to carry out optical writing processes onto the photosensitive drums 222a through 222d by using laser beam scanning and exposure; however, instead of these laser beam scanner units, a writing optical system (LED head) consisting of a light-emitting diode array and an imaging lens array may be used. The LED head has a size smaller than that of the laser beam scanner unit, and is noiseless since there is no movable part; therefore, it is preferably applied to an image-forming apparatus such as a digital color copying machine of the tandem system that requires a plurality of optical writing units.

Figure 1:
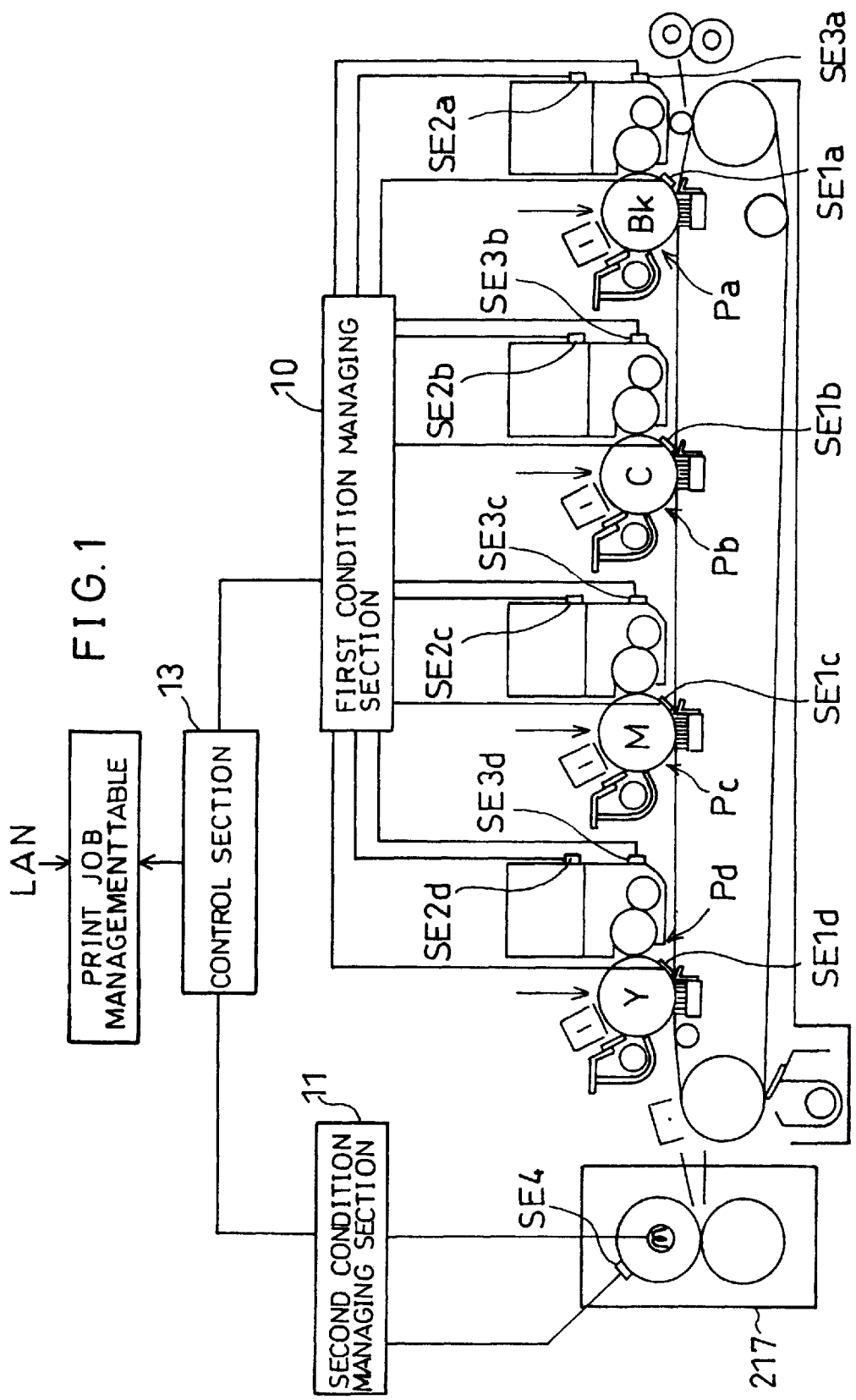
FIG. 1, which shows one embodiment of the present invention, is an explanatory drawing that shows a condition managing section that controls statuses of various sections in a color digital copying machine.
Figure 3:
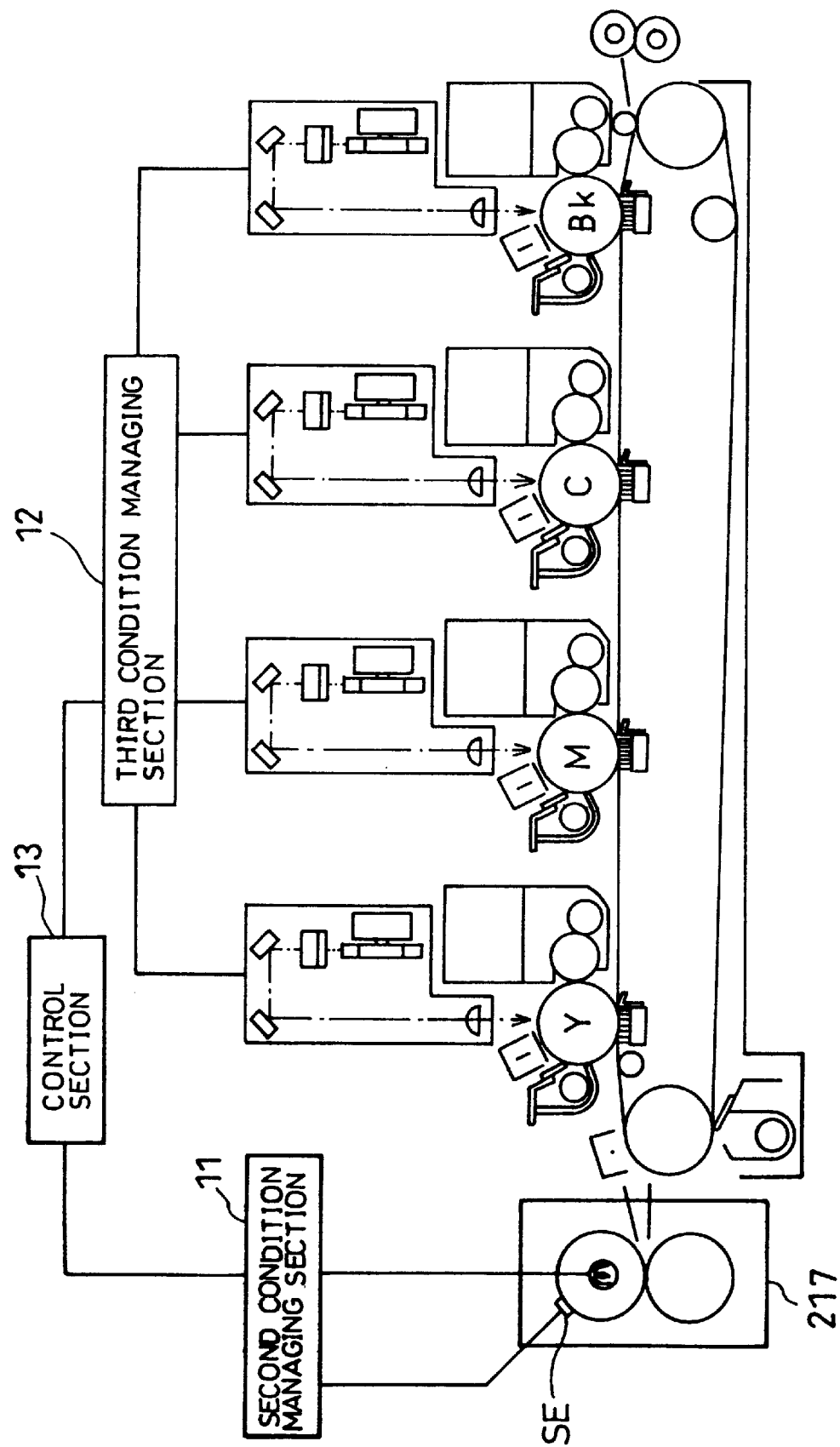
FIG. 3 is an explanatory drawing that shows a condition managing section that controls statuses of various sections in a color digital copying machine.

The digital color copying machine of the present invention carries out an output managing process so as to effectively perform an image data output immediately after application of power. For this reason, the digital color copying machine is provided with a condition managing means that includes a first condition managing section (image recording condition managing section) 10 and a second condition managing section (fixing condition managing section ) 11 as illustrated in FIG. 1, and further includes a third condition managing section 12 as illustrated in FIG. 3.

The conditions of respective parts controlled by the first through third condition managing sections are sent to a control section 13, and based upon the resulting conditions, the control section 13 determines the output order of image data, and controls the conditions of the image recording section and the fixing device through the image recording section and the first through third condition managing sections. In other words, the control section 13 corresponds to a process order decision means and a control means disclosed in claims of the present invention.

The first condition managing section 10 controls various conditions of image forming processes in a first image recording section for recording and reproducing monochrome images (in this case, the first image station Pa in FIG. 2 corresponds to the first image recording section) and a second image recording section for recording and reproducing color images (in this case, the first through fourth image stations Pa to Pd in FIG. 2 correspond to the second image recording section).

More specifically, the following operations are carried out with respect to managing of the image forming processes. In order to confirm whether or not the density of an image to be reproduced on the photosensitive member is reproduced in a stable manner, a test pattern, for example, is formed on the photosensitive member, and the density at this time is confirmed by sensors (SE1a, SE1b, SE1c and SE1d). Information representing the toner remaining quantity in the developing hopper in each of the recording sections is confirmed by each of the sensors (SE2a, SE2b, SE2c, SE2d), and the toner density of the developer in each of the developing devices is confirmed by each of the sensors (SE3a, SE3b, SE3c, and SE3d). Based upon the results of detections of these sensors, the first condition managing section 10 carries out management processes as to whether or not the image forming conditions in the respective recording sections have attained predetermined levels, and adjusts at least one output of the charging, exposing, developing and transferring processes at each recording section so as to reproduce an image in a predetermined state at each of the recording sections.

The second condition managing section 11 carries out managing on the condition of the fixing section for fixing a toner image on a copying material, the toner image being representative of a monochrome image or a color image record thereon. With respect to the managing of the fixing section, for example, the current fixing temperature is managed based upon detection data obtained from the sensor (SE4) so that it is possible to directly detect whether or not the fixing temperature has risen to a temperature appropriate for a fixing process for a color image, or what level the surface temperature of the fixing roller has reached, upon application of power or upon reset from a regular inspection or a power-saving mode (at the time of returning to an operable state for image formation). Based upon the results of the detection, the second condition managing section 11 adjusts power supply to the heater until the fixing roller in the fixing section has reached a predetermined temperature.

Moreover, a laser recording unit for recording an image by scanning the laser light beam modulated in accordance with image data is placed above each of the image recording sections (in this case, the monochrome image recording speed>the color image recording speed). In the laser recording unit, a polygon mirror for deflecting the laser light beam in the main scanning direction is installed, and the third condition managing section 12 controls the polygon mirror so as to have a predetermined number of revolutions appropriate for a set mode. In other words, for each of the laser recording units, while monitoring the rotation condition of a dc motor for rotating the polygon mirror, the third condition managing section 12 carries out a switching control so as to provide a predetermined number of revolutions in accordance with an image to be recorded and reproduced.

Under the above-mentioned managements made by the first through third condition managing sections 12, the copying machine 1 of the present embodiment discriminates whether or not the first and second recording sections are in appropriate states for scanning and recording the modulated laser light beam, or whether or not the fixing section is in an appropriate state for fixing a transferred toner image, for each of monochrome image data and color image data.

Normally, the fixing temperature at which black toner is fixed onto a copying material is lower than the fixing temperature at which a color image is fixed onto a copying material, and the fixing temperature in the fixing section is switched depending on whether a color image is fixed or a monochrome image is fixed. In other words, in order to direct the machine to an operative state for image output after power application, the machine has to be brought into an operative state for fixing a color image or a monochrome image. Normally, with respect to the level to which the machine is directed at the time of power application, either of the modes is preliminarily set as a standard mode. Thus, if the standard mode is the monochrome mode, the machine will be brought to the level capable of outputting a monochrome image, and if the standard mode is the color mode, it will be brought to the level capable of outputting a color image.

Moreover, in the laser recording unit also, the recording speeds of images are different depending on a color image and a monochrome image as described earlier; therefore, depending on which mode is set at the time of power application, the monochrome mode or the color mode, the third condition managing section 12 controls the polygon mirror so as to have the number of revolutions suitable for the set mode.

Figure 4:
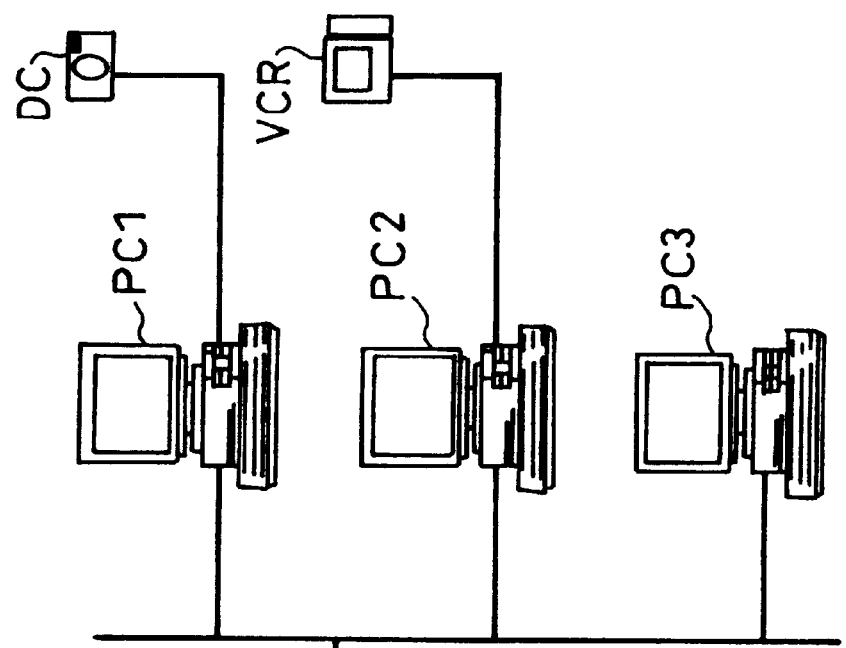
FIG. 4 is an explanatory drawing that shows a state in which a plurality of external apparatuses are connected to the color digital copying machine in a manner so as to form a network.
Figure 4:
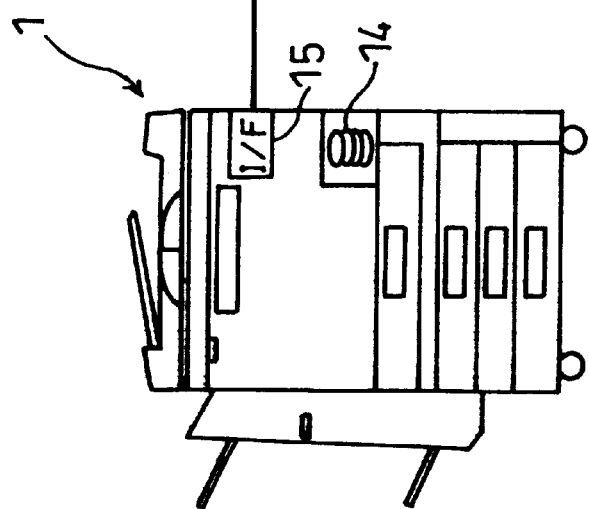

FIG. 4 illustrates data processing apparatuses that are connected to the color digital copying machine shown in FIG. 2, and in this network connection environment, personal computers (PC1, PC2, and PC3), a video (VCR) and a digital camera (DC) are connected to a digital color copying machine 1. Of course, besides these, various external processing apparatuses capable of processing digital image data can be connected. Here, the above-mentioned color digital copying machine has a communication section (image input section image input means) I/F 15 so as to receive image data transmitted from these data processing apparatuses.

The digital color copying machine 1 temporarily stores image data transmitted from the various apparatuses connected in this network on a job basis in a storing device such as a hard disk (image storing means) 14, and after confirming the status of the digital color copying machine 1 and the contents of the job at this time, reads any job information that can be processed and outputted for printing, and preferentially carries out a printing output. In other words, jobs that have been instructed from the respective terminals through the network of FIG. 4 are accepted and managed by a print job management table (see FIG. 1). The control section 13 confirms this print job management table and the status of the digital color copying machine 1 so as to carry out the processes of the present invention.

With respect to the printing order decision method for the printing job of the present embodiment, an explanation will be given by means of specific examples.

EXAMPLE 1

As described above, the temperature at which a monochrome image is fixed is lower than the temperature at which a color image is fixed. Normally, during warming up immediately after power on, in the fixing section, the surface temperature of the fixing roller is raised to a predetermined temperature which also allows a fixing process for a color image, and then a printing output is started.

However, in the operation of the present example, during the above-mentioned warming up, if a request for printing with respect to a monochrome image has been given at the time when the temperature that allows a fixing process for a monochrome image has been attained, although the temperature that allows a fixing process for a color image has not been attained in the fixing section, a printing output for this monochrome image is preferentially carried out; thus, it becomes possible to improve the efficiency of the printing process during the warming up.

Figure 5:
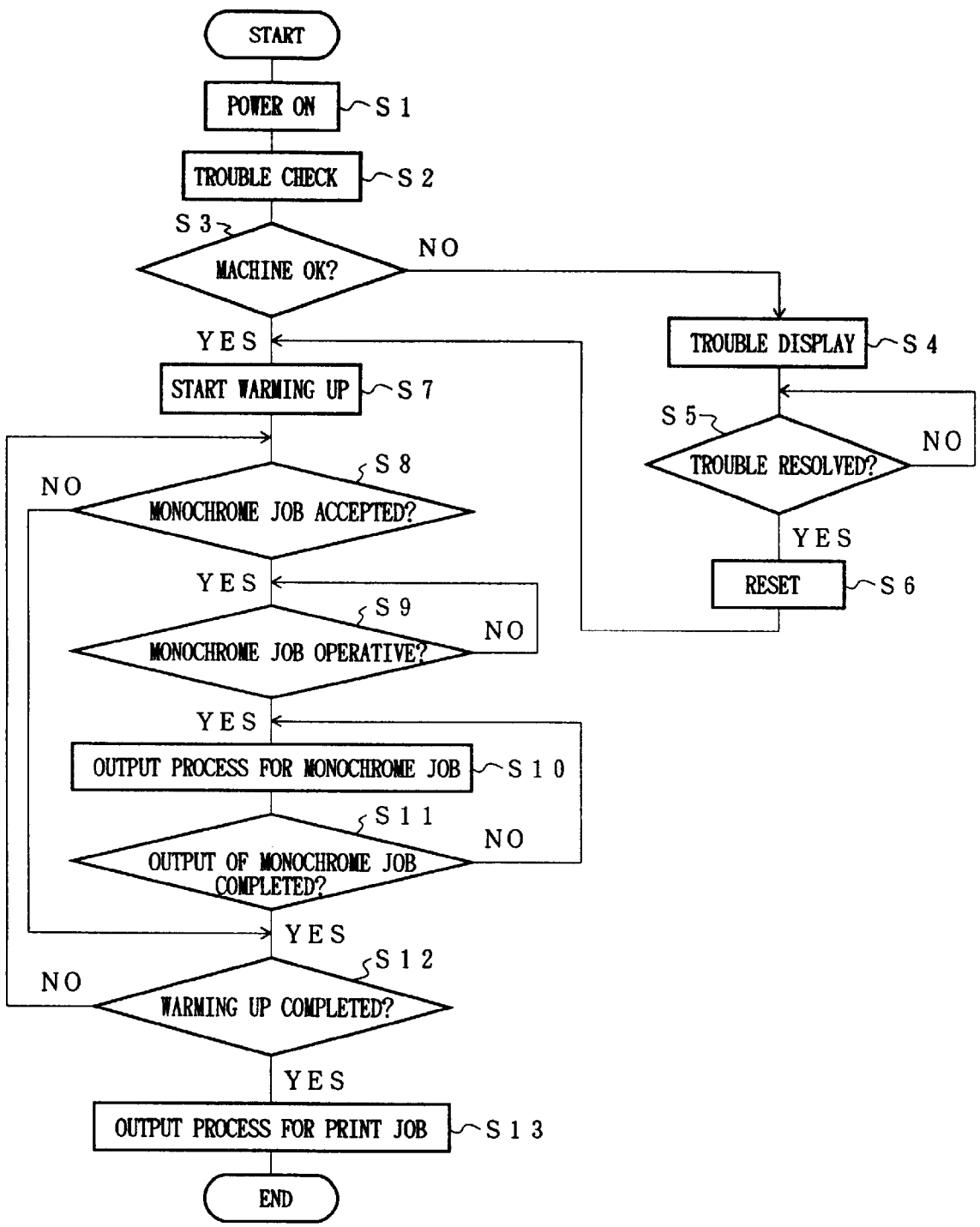
FIG. 5 is a flow chart that shows the operation of a color digital copying machine in accordance with Example 1.

FIG. 5 shows a flow chart of the above-mentioned operation.

First, when power is applied to the apparatus (S1), the apparatus checks itself for any abnormality (trouble check: S2). If, in this trouble check, a judgment is made that the apparatus is inoperable (remaining paper in a transport path, damage to one part of the mechanism, etc.) (NO in S3), a message is given so as to address the abnormality (trouble) (S4), and if this trouble has been resolved (YES in S5), the sequence proceeds to the normal routine (S7 and after) after resetting.

If no abnormality is found in the step S3 or if, although any abnormality was found, the trouble has been resolved by the recovering process, warming up for the fixing section is started at S7. In this case, the set target temperature to which the fixing roller is heated is defined as a temperature that allows a fixing process for a color image.

Here, if a printing job for a monochrome image is requested during the warming up (YES in S8), the second condition managing section 11 makes a judgment as to whether or not the fixing section can process the monochrome image (S9). Here, if the judgment shows that the printing job for the monochrome image is available, the printing job for the monochrome image is carried out (S10).

After completion of the printing output for the monochrome image (YES in S11), confirmation is made as to whether or not the warming up has reached its final stage (S12), and if it has been complete, the sequence proceeds to the normal printing job after the warming up (Sl3), while if it has not been complete, the above-mentioned steps S8 to S11 are repeated until the completion of the warming up.

An explanation will be given on the above-mentioned operation by means of a more specific example. For example, in the case when a printing instruction as shown in the job list of FIG. 6 is given during the warming up, job 1 for color images and job 2 related to color images and monochrome images in a combined manner are brought into a stand-by state, and job 3 for only monochrome images is preferentially subjected to an outputting process at the time when a fixing process for monochrome images becomes operative. When after completion of the warming up, the outputting process for color images has become operative, job 2 and job 3 are successively subjected to the outputting process.

Here, in the operation of the copying machine related to Example 1, the order of preference in output jobs during warm up is controlled depending on the fixing temperature; however, the present invention is not intended to be limited thereby, and the output job order of preference may be controlled depending on, for example, the status of the image recording section managed by the first condition managing section 10. in other words, if a printing instruction as shown in the job list of FIG. 6 is given in a case where optimal image-forming conditions with a stable developer density are available in the first image station Pa for recording and reproducing monochrome images, while in at least one of the second through fourth image stations Pb to Pd for recording and reproducing color images, the density of the developer is still unstable, and is being adjusted, job 1 for color images and job 2 related to color images and monochrome images in a combined manner are brought into a stand-by state, and job 3 for only monochrome images is preferentially subjected to an outputting process.

Moreover, with respect to job 2 containing to color image page data and monochrome image page data in a combined manner, for example, if only the outputting process for the monochrome images is first carried out at the time when the output of monochrome image data becomes operative, there is a possibility that only the pages for monochrome image data that have been outputted prior to completion of the outputting job might be taken away. For this reason, with respect to the above-mentioned job 2, at the time when the image recording condition managing section has made a judgment that the first image recording section and the second image recording section have reached a recordable state respectively, that is, when both monochrome images and color images can be recordable, an output order decision section decides the output order so that the above-mentioned job 2 can be outputted on a job basis.

Moreover, the job output may be managed in association with combinations of the statuses of the recording sections and the statuses of the fixing sections and further in association with the statuses of other machine statuses.

As described above, the image output apparatus of Example 1 is provided with the first through third condition managing sections 10 to 12 for managing the condition of the image forming section 210 during the warming up of the image output processing apparatus, and a control section 13 for determining an output process order for image data in accordance with the status of the image forming section 210 managed by the first through third condition managing sections 10 to 12 and the contents of image data stored in the storing device 14.

In the above-mentioned construction, during the warming up of the image output processing apparatus, the status of the image forming section 210 is managed by the first through third condition managing sections 10 to 12. For this reason, in the case when the image forming section 210 is operative under a plurality of different operation environments, the first through third condition managing sections 10 through 12 make judgements as to any environment that first becomes operative, and preferentially carries output processes successively starting with a job the image data of which can be outputted under this environment; thus, it becomes possible to carry out output processes efficiently without delay in carrying out jobs.

Moreover, the image forming section 210 contains the first image recording section for carrying out image recording on monochrome images and the second image recording section for carrying out image recording on color images, and the first condition managing section 10 manages the statuses of the first and second image recording sections, while the control section 13 determines an output process order for image data in accordance with the statuses of the first and second image recording sections managed by the first condition managing section 10 and the contents of image data stored in the storing device 14.

With this arrangement, the first condition managing section 10 controls the statuses of the first image recording section for carrying out image recording on monochrome images and the second image recording section for carrying out image recording on color images respectively; thus, in either of the first image recording section and the second image recording section, the image recording section that first becomes operative allows to successively carry out outputting processes successively, preferentially starting with any job that can be output-processed by the image recording section that has been first become operative. This makes it possible to carry out output processes efficiently without delay in carrying out jobs.

Moreover, the control section 13 determines the output process order for image data in accordance with the fixing conditions of the fixing section controlled by the second control managing section 11 and the contents of image data stored in the storing device 14.

As described above, since the second condition managing section 11 controls the fixing temperature of the fixing section, any job that first becomes operative in the fixing process between the monochrome imaging job and color imaging job that require different fixing temperatures respectively is preferentially subjected to an output process successively; thus, it becomes possible to carry out output processes efficiently without delay in carrying out jobs.

EXAMPLE 2

In the above-mentioned Example 1, the explanation has been given of the case in which, with respect to any image that has reached an operative state for printing, a printing output thereof is preferentially carried out so that the printing output during warming up can be efficiently performed. Here, in Example 2, an explanation will be given of a case in which the status of a copying machine, such as, in particular, the fixing temperature in the fixing section, is controlled in accordance with the contents of a job for which a printing request has been given during warming up, in order to improve the efficiency.

Immediately after application of power to a copying machine, the copying machine is brought into a status that corresponds to the preliminarily set standard mode. This explanation exemplifies a case in which the standard mode is a monochrome mode. In Example 2, however, the contents of image data for which a printing request has been given during warming up are confirmed, and a change in modes is carried out in accordance with image data of a job located at the leading portion of the data.

For example, in the case when, during a warming up process of the apparatus, three jobs, as shown in FIG. 6, have already been sent, since, in this case, job 1, which is the leading job in an image list for which a printing request has been given, is a job for color images, control is made so as to perform warming up until a color image forming mode, that is, an operative state for color images, has been achieved, even if the monochrome mode is set as the standard mode.

Then, once the recordable and reproducible status for color images has been achieved, the first job is executed.

Here, with respect to a condition that is differently controlled depending on the image forming modes, besides the above-mentioned fixing temperature, the number of revolutions of a polygon mirror in the image recording section is listed. In other words, the number of revolutions of the polygon mirror is differently controlled depending on a high-speed recording mode and a low-speed recording mode. Therefore, if the leading job in an image list for which a printing request has been given during warming up of the apparatus is a low-speed recording job (for example, a color image), the number of revolutions of the polygon mirror is controlled so as to be set in the low-speed recording mode for image formation even if the high-speed mode (for example, monochrome mode) is set as the standard mode.

As described above, the image output processing apparatus in accordance with Example 2, which can form an image in a first image forming mode (for example, a monochrome mode) as well as in a second image forming mode (for example, a color image forming mode), is provided with the image forming section 210 which forms an image on recording paper in accordance with the conditions of image data stored in the storing device 14 and outputs this image, and the control section 13 for controlling the image forming section 210 so that the image forming section 210 is shifted to the first image forming mode or the second image forming mode so as to carry out the output process for the image data.

With the above-mentioned arrangement, during a warming up process of the image output processing apparatus, the control section 13 shifts the mode of the image forming section 210 to the first or the second image forming mode in accordance with the contents of jobs that have been stored in the storing device 14 in a stand-by state. Thus, at the time when the image output processing apparatus has reached a level of an image forming mode that is suitable for any job that is to be first subjected to an output process, the job is output processed. Consequently, it is possible to avoid the problem that no output process is available until the apparatus has reached a final level, and also to carry out the output process efficiently without delay in carrying out jobs.

In other words, when jobs have been accumulated in the storing device 14, the control section 13 determines an image forming mode in accordance with the contents of the job that is preceding from the other jobs, and controls the above-mentioned image forming section 210 so that the fixing temperature in the fixing section of the image forming section 210 is allowed to have a fixing temperature suitable for the determined image forming mode.

With this arrangement, in the case when, during warming up of the image output processing apparatus, any job has been accumulated in the storing device 14 in a stand-by state, once the fixing temperature has reached a level of the image forming mode that is suitable for the preceding job, the job is output processed; thus, it is possible to carry out the output process efficiently without delay in carrying out jobs.

Moreover, when jobs have been accumulated in the storing device 14, the control section 13 determines an image forming mode in accordance with the contents of the job that is preceding from the other jobs, and controls the above-mentioned image forming section 210 so that the number of revolutions of the polygon mirror in the laser recording unit of the image forming section 210 is allowed to have a number of revolutions suitable for the determined image forming mode.

With this arrangement, in the case when, during warming up of the image output processing apparatus, any job has been accumulated in the storing device 14 in a stand-by state, once the number of revolutions of the polygon mirror has reached a level of the image forming mode that is suitable for the preceding job, the job is output processed; thus, it is possible to carry out the output process efficiently without delay in carrying out jobs.

EXAMPLE 3

Figure 7A:
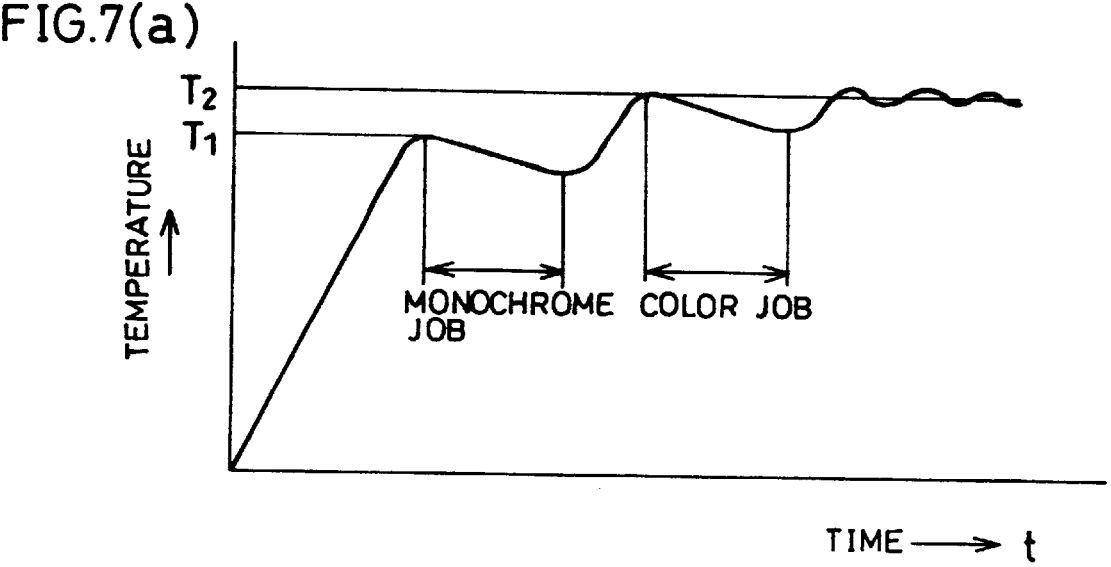
FIG. 7(a) and FIG. 7(b) are explanatory drawings that show temperature changes in the fixing device upon carrying out a printing job.
Figure 7B:
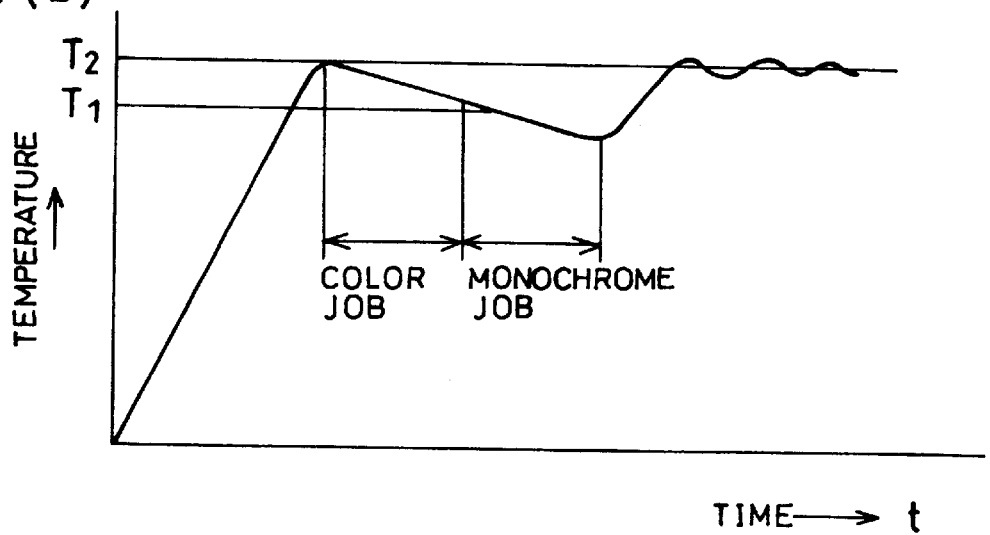

In the same manner as Example 2, in the operation of the present Example 3, immediately after application of power to a copying machine, the copying machine is brought into a status corresponding to the preliminarily set standard mode. However, in the present Example 3, with respect to pieces of image data for which printing requests are given during warming up, if there is any data related to color images, the job for the color images is preferentially subjected to an output process. In other words, in the case when, during warming up of the apparatus, three jobs, as shown in FIG. 6, have already been sent, a process order is determined so that, among the three jobs, any job for color images is preferentially processed. The reasons for this are explained as follows:

In other words, the temperature which allows color toner images to be fixed is higher than the temperature which allows monochrome toner images to be fixed, and the fixing temperature (the roller temperature of the fixing roller) in the fixing section reduces due to fixing of toner images. For this reason, for example as shown in FIG. 7(a), in the case where, when the temperature T1 which allows monochrome toner images to be fixed has been reached, a fixing process for a monochrome image is carried out and a fixing process for a color image is then carried out, it is necessary to raise the fixing temperature again to the temperature T2 which allows color tone images to be fixed. In contrast, as shown in FIG. 7(b), in the case where, after warming up has been made to the temperature T2 for fixing color toner images beforehand, a fixing process for a color toner image is carried out, even if a slight temperature variation occurs in the fixing temperature due to the fixing process for the color toner image, if the temperature is higher than T1, a job for monochrome images following the job for color images can be continuously outputted; consequently, it is possible to carry out output processes efficiently without delay in carrying out jobs.

Figure 8:
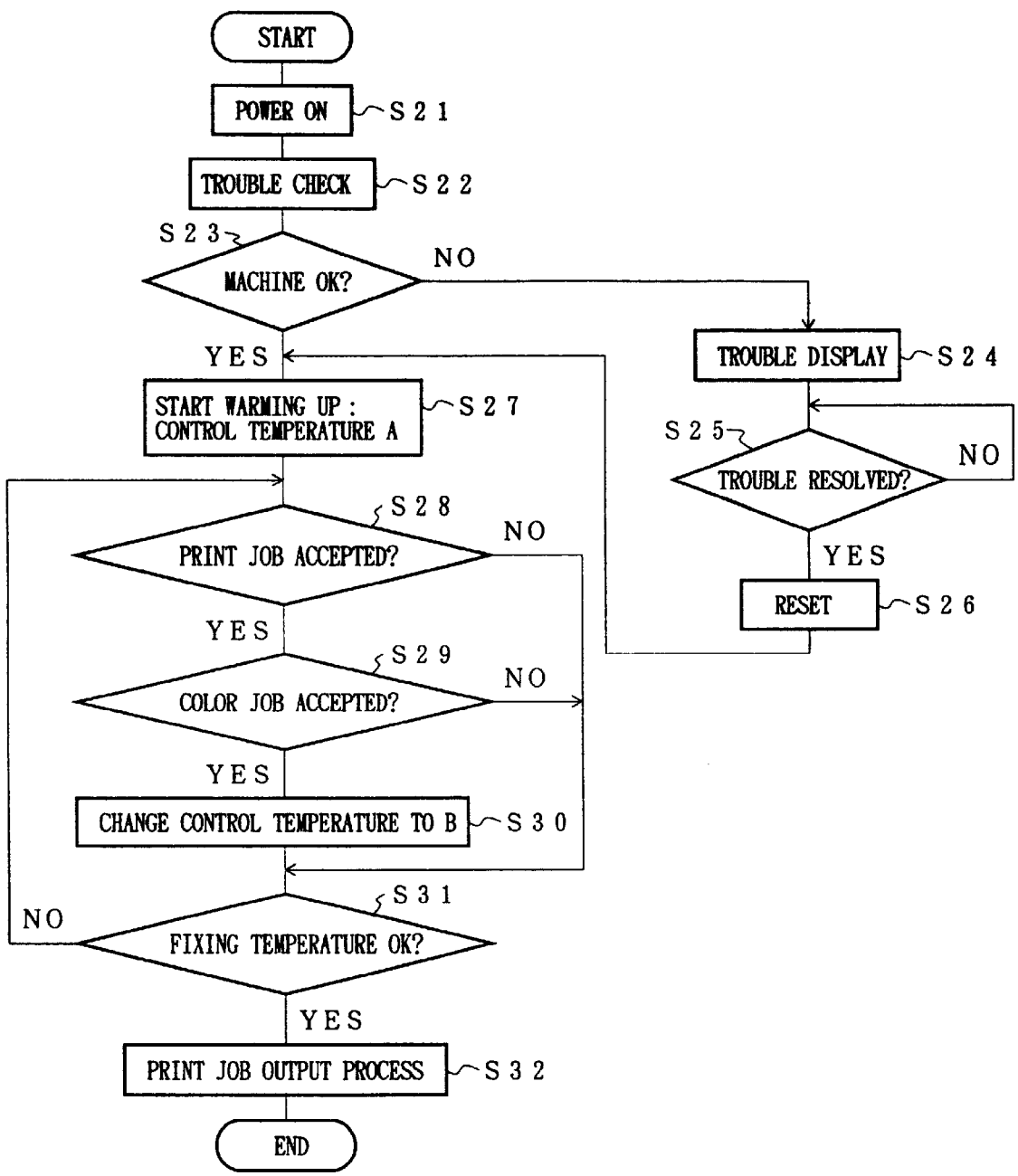
FIG. 8 is a flow chart that shows the operation of a color digital copying machine in accordance with Example 3.

Referring to a flow chart in FIG. 8, the following description will discuss the operation of the present Example 3. Here, in the flow chart of FIG. 8, since the steps S21 through S26 are the same as those steps S1 through S6 shown in FIG. 5 in Example 1, the explanation thereof is omitted.

In the steps S21 through S26, if no abnormality is found in the apparatus at S23, or when, although any abnormality is found, the trouble has been removed by the recovering process, the warming up of the fixing section is started at S27. In this case, the target temperature in the fixing section is set at a control temperature A. Here, the control temperature A is a fixing temperature in the setting mode. Therefore, since the standard mode is set to the monochrome mode, the control temperature A is a temperature that allows monochrome images to be fixed.

When any print jobs are requested during the warming up (YES at S28), a judgment is made as to whether or not any job for color images exists in the print jobs that have been accepted (S29). Here, if any job for color images exists, the target temperature of the fixing section is changed to a control temperature B so as to allow color images to be fixed (S30). Here, the control temperature B is a temperature that allows color images to be fixed. Moreover, if there is no job for color images at S29, the control temperature is set at A.

Thereafter, confirmation is made as to whether or not the fixing temperature has reached the control temperature (that is, whether or not the warming up has been complete) (YES at S31), and if it has reached the control temperature, an output for the print job is started (S32). Moreover, if the fixing temperature has not reached the control temperature at S30, the steps S28 through S31 are repeated until the warming up has been complete.

As described above, in the image output processing apparatus of the present example 3, in the case when any job for color images has been accumulated in the storing device 14, the control section 13 controls the image forming section 210 so that the fixing temperature in the fixing section of the image forming section 210 is set to a fixing temperature corresponding to the image forming mode at the time of recording color images.

Normally, the temperature for fixing color images is higher than the temperature for fixing monochrome images; therefore, even if the fixing temperature slightly drops at the time of fixing a color image, it is possible to ensure a fixing temperature that raises no problem in fixing monochrome images. Therefore, a monochrome image can be fixed following the fixing process for a color image, and this makes it possible to efficiently carry out output processes for a plurality of print jobs.

EXAMPLE 4

The present example 4 exemplifies a case in which, in accordance with the contents of jobs for which printing requests have been given during warming up, the status of a copying machine, that is, in particular, the number of revolutions of the polygon mirror in the image recording section, is controlled so as to improve the efficiency.

In the operation of Example 4, in the same manner as Examples 2 and 3, immediately after power application to the copying machine, the copying machine is brought into a status corresponding to the standard mode that has been preliminarily set. Here, in the present Example 4, with respect to image data for which a printing request is given during warming up, a judgment is made as to whether the high-speed mode or the low-speed mode is required, and based upon the result of the judgement, the number of revolutions in the polygon mirror is controlled.

For example, in the case when, during warming up of the apparatus, three jobs as shown in FIG. 6 have already been sent, the contents of the three jobs are confirmed and classified into the high-speed recording mode and the low-speed recording mode. Here, in general, the monochrome image recording mode and the high-resolution recording mode require the high-speed recording mode, and the color image recording mode and the low-resolution recording mode require the low-speed recording mode. Moreover, it is supposed that the standard mode in Example 4 is set to the monochrome mode.

In Example 4, with respect to image data for which printing requests have been given during warming up, if there are any jobs related to the high-speed recording mode, the jobs are preferentially subjected to output processes. In other words, in the case when, during warming up of the apparatus, the three jobs as shown in FIG. 6 have already been sent, the order of processes is determined so that any job(s) related to the high-speed recording mode among the three is preferentially processed. The reasons for this are explained as follows:

Here, the high-speed recording mode and the low-speed recording mode have respectively different numbers of revolutions to be required, and the high-speed recording mode needs a higher number of rotations of the polygon mirror. Moreover, when a switchover is made between the high-speed recording mode and the low-speed recording mode, it is necessary to change the number of revolutions of the polygon mirror as well, and in this case, the time it takes to switch from the high-speed revolutions to the low-speed revolutions is longer than the time it takes to switch from the low-speed revolutions to the high-speed revolutions.

Figure 9:
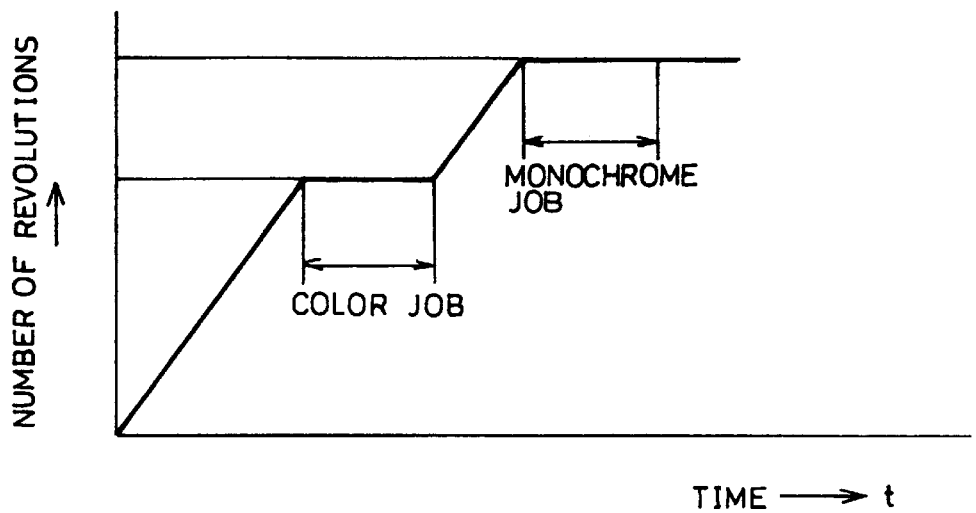
FIG. 9(a) and FIG. 9(b) are explanatory drawings that show changes in the number of revolutions of a polygon mirror in a laser recording device upon carrying out a printing job.
Figure 9:
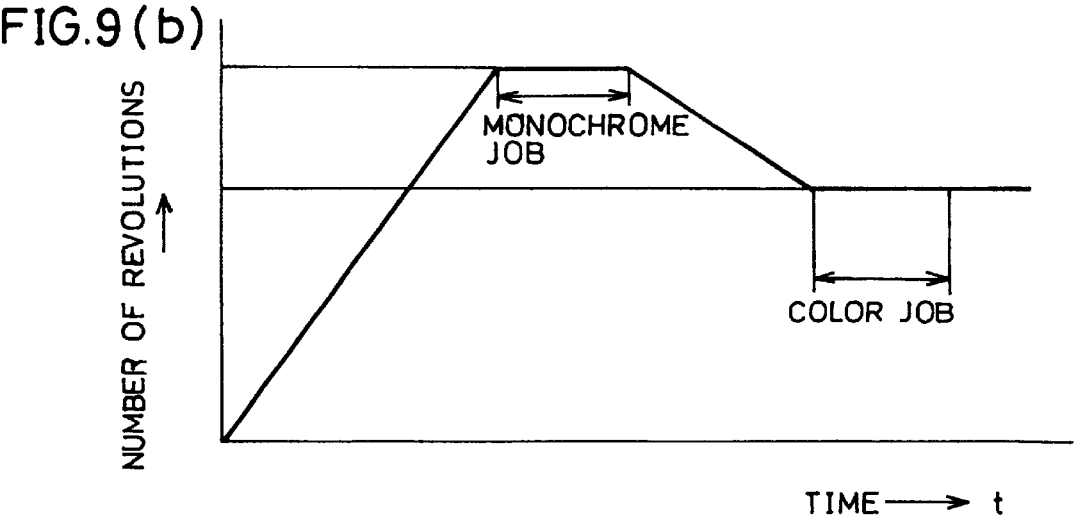

Therefore, with respect to the time required for the polygon mirror to switchover its number of revolutions, it takes shorter to first carry out a color image output and then carry out a monochrome image output as shown in FIG. 9(a) than to first carry out a monochrome image output with the polygon mirror being rotated at a high speed and then carry out a color image output after having switched the polygon mirror to a low speed as shown in FIG. 9(b); therefore, this arrangement results in an efficient output process.

Figure 10:
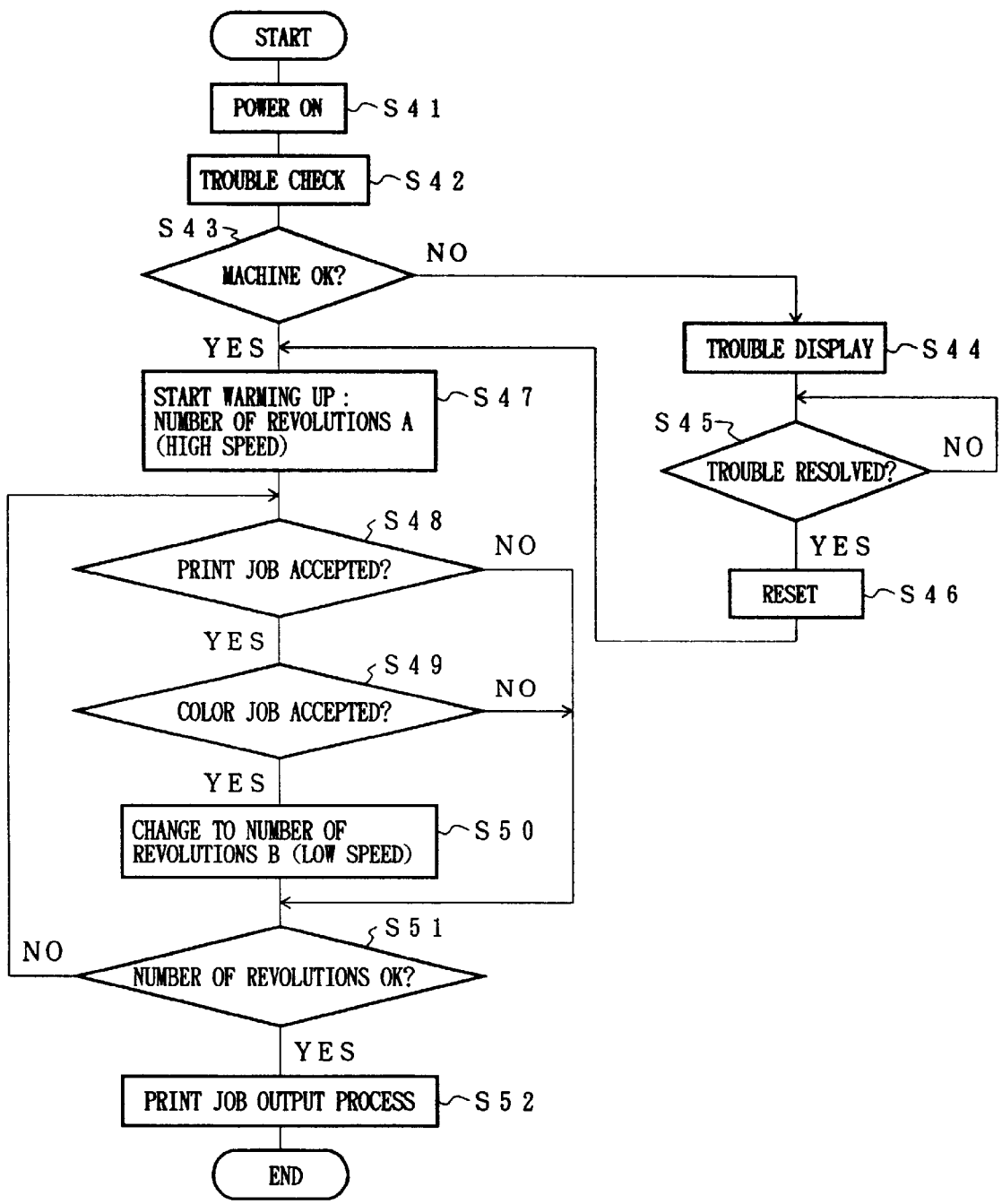
FIG. 10 is a flow chart that shows the operation of a color digital copying machine in accordance with Example 4.

Referring to a flow chart of FIG. 10, the following description will discuss the operation of Example 4. Here, in the flow chart of FIG. 10, the steps S41 through S46 are the same as those steps S1 through S6 of FIG. 5 in Example 1; therefore, the explanation thereof is omitted.

In the steps S41 through S46, if no abnormality is found in the apparatus at S43, or when, although any abnormality is found, the trouble has been removed by the recovering process, the warming up of the fixing section is started at S47. In this case, the number of revolutions of the polygon mirror is set to the number of rotations A at the time of high-speed rotations that corresponds to the monochrome mode as the standard mode.

When any print jobs are requested during the warming up (YES at S48), a judgment is made as to whether or not any job related to the low-speed recording mode, that is, in this case, any job for color images, exists in the print jobs that have been accepted (S49). Here, if any job for color images exists, the number of revolutions of the polygon mirror in the image recording section is changed to the number of rotations B at the time of low-speed rotations (S50). Moreover, if there is no job for color images at S49, the number of revolutions of the polygon mirror is maintained at the number of revolutions A.

Thereafter, confirmation is made as to whether or not the number of revolutions of the polygon mirror has reached the set number of revolutions (that is, whether or not the warming up has been complete) (YES at S51), and if it has reached the set number of revolutions, an output for the print job is started (S52). Moreover, if the number of revolutions of the polygon mirror has not reached the set number of revolutions at S50, the steps S48 through S51 are repeated until the warming up has been complete.

In the above explanation, the number of revolutions of the polygon mirror is switched between monochrome images and color images; however, the number of revolutions of the polygon mirror may be switched between a mode for recording high-resolution images and a mode for recording low-resolution images.

As described above, in the image output processing apparatus of the present example 4, in the case when any job for forming images at a low-speed recording process has been accumulated in the storing device 14, the control section 13 controls the image forming section 210 so that the number of revolutions of the polygon mirror in the laser recording unit of the image forming section 210 is set to the number of revolutions corresponding to the image forming mode at the time of low-speed recording.

Normally, the time it takes for the polygon mirror to switch from the number of revolutions at the time of low-speed recording to the number of revolutions at the time of high-speed recording is shorter than the time it takes in the reversed case; therefore, it is possible to carry out efficient output processes on a plurality of print jobs by processing the job for forming an image at low-speed recording prior to the job for forming an image at high-speed recording.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image output processing apparatus comprising:
    image input section for inputting image data;
    image storing section for storing the image data inputted by the image input section on a job basis;
    image forming section for forming an image of the image data stored in the image storing section on recording paper, and for performing the resulting output;
    condition managing section for managing the status of the image forming section during the warming up of the image output processing apparatus; and
    process order decision section for determining the order of output processes of the image data based upon the status of the image forming section managed by the condition managing section and the contents of the image data stored in the image storing section; wherein the image forming section comprises a first image recording section for carrying out image recording of a monochrome image and a second image recording section for carrying out image recording of a color image;

the condition managing section comprises an image recording condition managing section for respectively managing conditions of the first and second image recording sections; and the process order decision section determines the order of output processes of the image data based upon the conditions of the first and second image recording sections managed by the image recording condition managing section and the contents of image data stored in the image storing section.

2. The image output processing apparatus as defined in claim 1, wherein, when the image recording condition managing section has made a judgment that either the first image recording section or the second image recording section has become operative state for image recording, the process order decision section determines the order of output processes of the image data so as to allow the image recording section that has become operative for image recording to preferentially output image data that can be outputted by the image recording section.

3. The image output processing apparatus as defined in claim 2, wherein with respect to a print job containing monochrome image page data and color image page data in a combined manner, the process order decision section determines an order of outputs when the image recording condition managing section has made a judgment that the first image recording section and the second image recording section have become operative for recording respectively.

4. An image output processing apparatus comprising:

image input section for inputting image data;

image storing section for storing the image data inputted by the image input section on a job basis;

image forming section for forming an image of the image data stored in the image storing section on recording paper, and for performing the resulting output;

condition managing section for managing the status of the image forming section during the warming up of the image output processing apparatus; and process order decision section for determining the order of output processes of the image data based upon the status of the image forming section managed by the condition managing section and the contents of the image data stored in the image storing section; wherein:

the condition managing section comprises a fixing condition managing section for managing fixing conditions in a fixing section of the image forming section; and the process order decision section determines an order of output processes for image data based upon the fixing conditions of the fixing section managed by the fixing condition managing section and the contents of the image data stored in the image storing section; and in the case when image data of monochrome images have been stored in the image storing section, the process order decision section preferentially outputs the image data of monochrome images at the time when the fixing condition managing section has made a judgment that the fixing section has become operative for a fixing process of monochrome images.

5. An image output processing apparatus comprising:

image input section for inputting image data;

image storing section for storing the image data inputted by the image input section on a job basis;

image forming section which is capable of forming images in a first image forming mode and a second image forming mode different from the first image forming mode, and which forms an image of the image data stored in the image storing section on recording paper and outputs this; and control section which controls the image forming section so that, during warming up of the image output processing apparatus, the mode of the image forming section is shifted to the first mode or the second mode in accordance with the conditions of the image data stored in the storing section so as to carry out an output process for the image data.

6. The image output processing apparatus as defined in claim 5, wherein in the case when jobs have been stored in the image storing section, the control section determines an image forming mode in accordance with the contents of a job that precedes the other jobs, and controls the image forming section so that a fixing section in the image forming section has a fixing temperature suitable for the determined image forming mode.

7. The image output processing apparatus as defined in claim 5, wherein in the case when jobs related to color images have been stored in the image storing section, the control section controls the image forming section so that a fixing section in the image forming section has a fixing temperature suitable for the image forming mode for color image recording.

8. The image output processing apparatus as defined in claim 5, wherein in the case when jobs have been stored in the image storing section, the control section determines an image forming mode in accordance with the contents of a job that precedes the other jobs, and controls the image forming section so that the number of revolutions of a polygon mirror in an image recording section of the image forming section has a number of revolutions suitable for the determined image forming mode.

9. The image output processing apparatus as defined in claim 5, wherein in the case when jobs for forming an image at low recording speed have been stored in the image storing section, the control section controls the image forming section so that the number of revolutions of a polygon mirror in an image recording section of the image forming section has a number of revolutions suitable for an image forming mode for low-speed recording.

10. An image output processing apparatus comprising:

image input means for inputting image data;

image storing means for storing the image data inputted by the image input means on a job basis;

image forming means which is capable of forming images in a first image forming mode and a second image forming mode different from the first image forming mode, and which forms an image of the image data stored in the image storing means on recording paper and outputs this; and control means which controls the image forming means so that, during warming up of the image output processing apparatus, the mode of the image forming means is shifted to the first mode or the second mode in accordance with the conditions of the image data stored in the storing means so as to carry out an output process for the image data.

* * * * *